US008989767B2

(12) United States Patent
Walker

(10) Patent No.: US 8,989,767 B2
(45) Date of Patent: Mar. 24, 2015

(54) WIRELESS COMMUNICATION SYSTEM WITH NFC-CONTROLLED ACCESS AND RELATED METHODS

(75) Inventor: David Ryan Walker, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 552 days.

(21) Appl. No.: 13/036,452

(22) Filed: Feb. 28, 2011

(65) Prior Publication Data

US 2012/0220224 A1    Aug. 30, 2012

(51) Int. Cl.
H04W 24/00 (2009.01)
H04L 29/06 (2006.01)
H04W 12/06 (2009.01)
H04W 84/18 (2009.01)
H04M 1/725 (2006.01)

(52) U.S. Cl.
CPC ........... *H04L 63/0853* (2013.01); *H04W 12/06* (2013.01); *H04L 63/0492* (2013.01); *H04W 84/18* (2013.01); *H04M 1/7253* (2013.01); *H04M 2250/04* (2013.01)
USPC ..................... 455/456.1; 455/41.1; 455/404.2

(58) Field of Classification Search
USPC ................ 455/41.1, 41.2, 41.3, 404.2, 456.1, 455/456.3
See application file for complete search history.

(56) References Cited

U.S. PATENT DOCUMENTS

| 5,544,321 | A | 8/1996 | Theimer et al. .......... 395/200.11 |
| 6,885,362 | B2 | 4/2005 | Suomela |
| 7,646,300 | B2 | 1/2010 | Steward et al. |
| 8,171,137 | B1 | 5/2012 | Parks et al. |
| 8,180,291 | B2 * | 5/2012 | Burr ............................. 455/41.2 |
| 2006/0052055 | A1 | 3/2006 | Rowse et al. |
| 2006/0294388 | A1 | 12/2006 | Abraham et al. |
| 2007/0008129 | A1 | 1/2007 | Soliman |
| 2007/0026801 | A1 | 2/2007 | Gerstenkom |
| 2007/0026802 | A1 | 2/2007 | Gerstenkorn |
| 2007/0037614 | A1 | 2/2007 | Rosenberg ................. 455/575.1 |

(Continued)

FOREIGN PATENT DOCUMENTS

| CA | 2769104 | 8/2012 |
| EP | 1808819 | 7/2007 |

(Continued)

OTHER PUBLICATIONS

U.S. Appl. No. 13/036,689, filed Feb. 28, 2011, Rose.

(Continued)

*Primary Examiner* — Ping Hsieh
(74) *Attorney, Agent, or Firm* — Allen, Dyer, Doppelt, Milbrath & Gilchrist, P.A.

(57) ABSTRACT

A wireless communication system may include a wireless access point including a first wireless transceiver and a controller associated therewith and providing wireless communications within a defined space having an entrance, and mobile wireless communications devices, each including a first near field communications (NFC) device and a second wireless transceiver communicating with the first wireless transceiver. The wireless communication system may also include a second NFC device adjacent the entrance of the defined space, and a third NFC device within the defined space. The controller may permit wireless communications of a given mobile wireless communications device with the wireless access point based upon communication of the corresponding first NFC device with the second and third NFC devices.

16 Claims, 3 Drawing Sheets

(56) References Cited

U.S. PATENT DOCUMENTS

| | | | |
|---|---|---|---|
| 2007/0075128 A1 | 4/2007 | Hall et al. | |
| 2007/0205861 A1 | 9/2007 | Nair et al. | |
| 2007/0254712 A1 | 11/2007 | Chitti | |
| 2007/0275735 A1 | 11/2007 | Estevez | |
| 2008/0014867 A1 | 1/2008 | Finn | |
| 2008/0090520 A1* | 4/2008 | Camp et al. | 455/41.2 |
| 2008/0160984 A1 | 7/2008 | Benes et al. | 455/419 |
| 2009/0119762 A1 | 5/2009 | Thomson et al. | |
| 2010/0068997 A1 | 3/2010 | Dunko | |
| 2010/0080163 A1 | 4/2010 | Krishnamoorthi et al. | |
| 2010/0156591 A1 | 6/2010 | Newman et al. | |
| 2010/0201536 A1 | 8/2010 | Robertson et al. | |
| 2011/0035604 A1 | 2/2011 | Habraken | |
| 2011/0119734 A1 | 5/2011 | Crawford | |
| 2011/0165859 A1* | 7/2011 | Wengrovitz | 455/411 |
| 2012/0075059 A1 | 3/2012 | Fyke et al. | |
| 2012/0221695 A1 | 8/2012 | Rose et al. | |

FOREIGN PATENT DOCUMENTS

| | | |
|---|---|---|
| EP | 2492875 | 8/2012 |
| EP | 2492878 | 8/2012 |
| WO | 2006132435 | 12/2006 |
| WO | 2010080821 | 7/2010 |
| WO | 2012/116446 | 9/2012 |

OTHER PUBLICATIONS

U.S. Appl. No. 13/036,874, filed Feb. 28, 2011, Hill.
U.S. Appl. No. 12/888,620, filed Sep. 23, 2010, Fyke et al.
U.S. Appl. No. 12/888,599, filed Sep. 23, 2010, Fyke et al.
Li et al. "*An Application Framework for Efficient, Reliable and Secure Access to Memory Spot*" www.hpl.hp.com/techreports/2006/HPL-2006-83R1.pdf Apr. 18, 2007.
NFC Forum, Frequently Asked Questions, NFC for consumers, http://www.nfo-forum.org/resources/faq#enabled, 2010, 6 pages.
"Third" The American Heritage Stedman's Medical Dictionary. Houghton Mifflin Co. Dec. 17, 2012 (dictionary.com) http://dictionary.reference.com/browse/third.
"CETECOM Inc. Adds Wi-Fi Protected Setup to its Wi-Fi Portfolio" www.cetecomusa.com/news/release/07-02-07-cetecom-11n.aspx Printed Oct. 4, 2010.
"Near-Field communication supports easy WiFi setting up" http://www.apptech.philips.com/technology/projects/near-field_wifi . . . Printed Oct. 4, 2010.
"Wi-Fi Protected Setup" http://en.wikipedia.org/wiki/Wi-Fi_Protected_Setup Printed Oct. 4, 2010.

* cited by examiner

WIRELESS COMMUNICATION SYSTEM WITH NFC-CONTROLLED ACCESS AND RELATED METHODS

TECHNICAL FIELD

This application relates to the field of communications, and, more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION OF THE PREFERRED EMBODIMENTS

Figure 1:
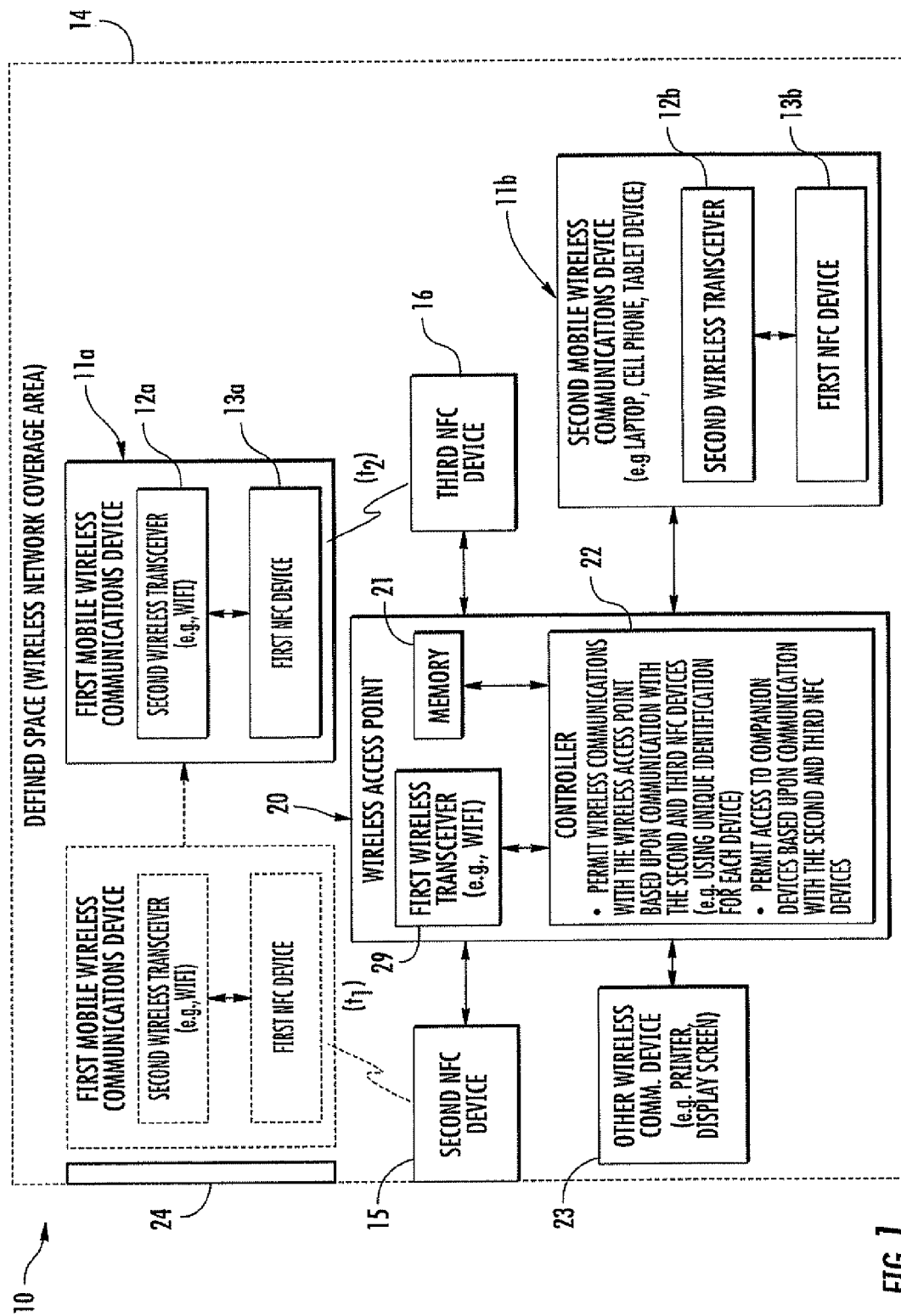
FIG. 1 is a schematic block diagram of an example embodiment of a wireless communication system.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a wireless communication system is disclosed herein that may comprise a wireless access point comprising a first wireless transceiver and a controller associated with the first wireless transceiver and configured to provide wireless communications within a defined space having an entrance. The wireless communication system may include a plurality of mobile wireless communications devices, each comprising a first near field communications (NFC) device and a second wireless transceiver configured to communicate the first wireless transceiver. The wireless communication system may also include a second NFC device adjacent the entrance of the defined space, and a third NFC device within the defined space. The controller may be configured to permit wireless communications of a given mobile wireless communications device with the wireless access point based upon communication of the corresponding first NFC device with the second and third NFC devices.

In particular, the controller may be configured to permit wireless communications of the given mobile wireless communications device with the wireless access point based upon sequential communication of the corresponding first NFC device with the second and third NFC devices. In some embodiments, each mobile wireless communications device may have a unique identification associated therewith, and the second and third NFC devices may be configured to receive a respective unique identification from adjacent mobile wireless communications devices.

More specifically, the controller may be configured to permit wireless communications of the given mobile wireless communications device when a same respective unique identification is sequentially received at the second and third NFC devices. The controller may be configured to disable wireless communications of the given mobile wireless communications device based upon a subsequent communication of the corresponding first NFC device with the second NFC device.

In other embodiments, the wireless communication system may further comprise at least one other wireless communications device within the defined space, and the controller may be configured to permit wireless communication between the given mobile wireless communications device and the at least one other wireless communications device also based upon the communication of the corresponding first NFC device with the second and third NFC devices. For example, the companion devices may comprise at least one of a printer device, a projector device, a photocopying device, a scanner device, a fax machine, a display device, or an external speaker device.

Additionally, the first and second wireless transceivers may each comprise a wireless local area network (e.g., IEEE 802.11 (WiFi)) transceiver. The controller may be configured to permit wireless communications of the given mobile wireless communications device further based receipt of an electronic payment associated therewith. For example, each mobile wireless communications device may comprise at least one of a mobile cellular wireless communications device, a laptop personal computer device, or a tablet computing device.

Another example aspect is directed to a wireless access point for a wireless communication system comprising a plurality of mobile wireless communications devices. Each mobile wireless communications device may comprise a first NFC device and a second wireless transceiver. The wireless communications system also may include a second NFC device adjacent the entrance of a defined space, and a third NFC device within the defined space. The wireless access point may comprise a first wireless transceiver and a controller associated therewith and configured to provide wireless communications within the defined space having the entrance. The controller may be configured to permit wireless communications of a corresponding second wireless transceiver of a given mobile wireless communications device with the first wireless transceiver based upon communication of the corresponding first NFC device with the second and third NFC devices.

Another example aspect is directed to a method of operating a wireless access point in a wireless communication system for providing wireless communications within a defined space having an entrance. The wireless communication system may include a plurality of mobile wireless communications devices each comprising a first NFC device, a second NFC device adjacent the entrance of the defined space, and a third NFC device within the defined space. The method may comprise permitting wireless communications of a given mobile wireless communications device with the wireless access point based upon communication of a corresponding first NFC device with the second and third NFC devices.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

By way of background, NFC is a short-range wireless communications technology in which NFC-enabled devices are "swiped," "bumped," or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 2:
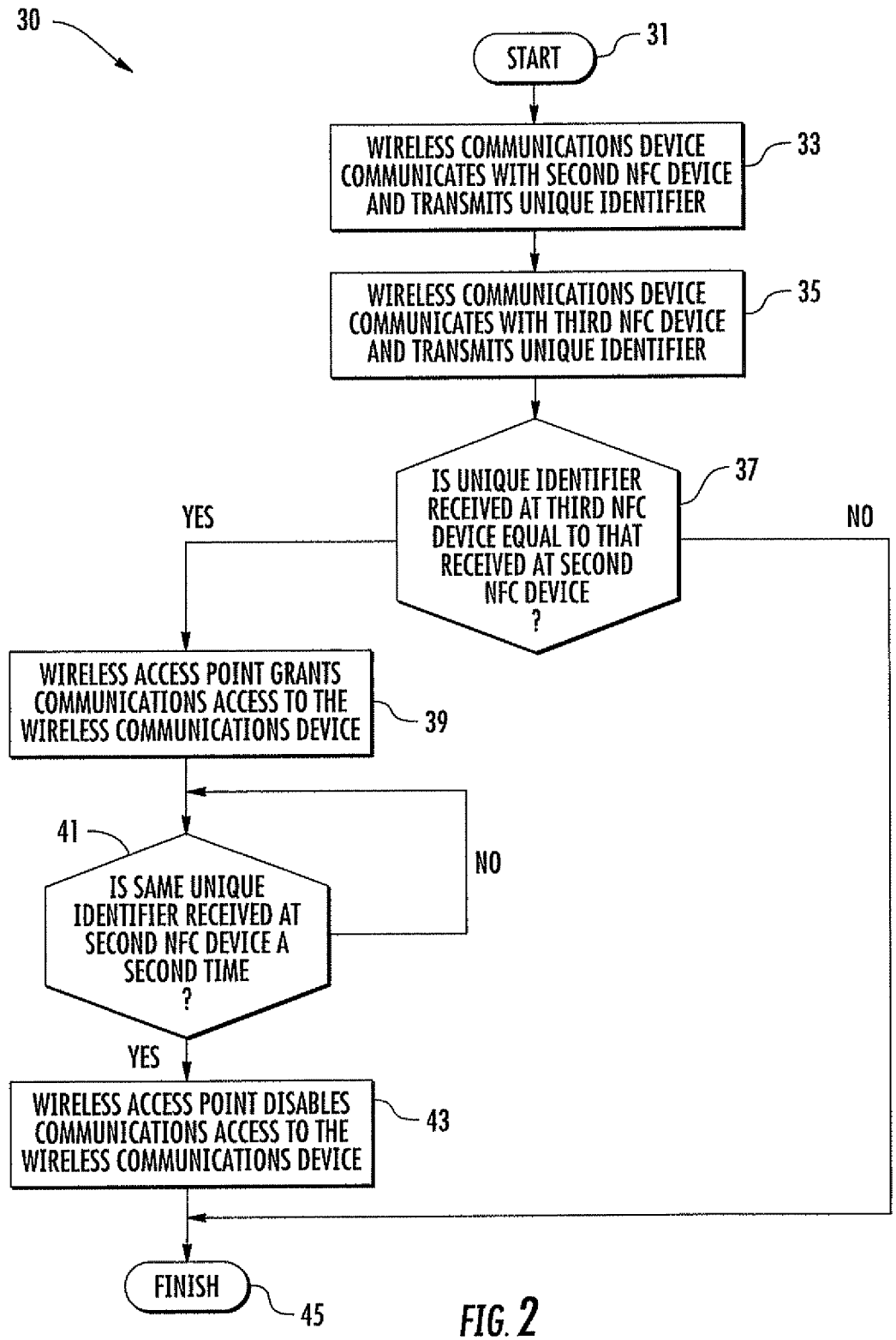
FIG. 2 is a flowchart illustrating method aspects associated with operation of the wireless communication system of FIG. 1.

Referring now to FIG. 1, a wireless communication system 10 according to the present disclosure is now described. Moreover, with reference additionally to FIG. 2, a flowchart 30 illustrates a method of operating the wireless communication system 10 and begins at Block 31. The wireless communication system 10 illustratively includes a wireless access point 20. The wireless access point 20 illustratively includes a memory 21, and a controller 22 coupled to the memory and configured to provide wireless communications within a defined space 14 (shown with dashed lines). For example, the defined space 14 may comprise a secured space having controlled access, such as an office building or a retail establishment. The defined space illustratively includes an entrance 24. In the illustrated embodiment, the wireless access point 20 comprises a first wireless transceiver 29, for example, an IEEE 802.11 (WiFi) transceiver.

The wireless communication system 10 illustratively includes a plurality of mobile wireless communications devices 11a-11b. For example, each mobile wireless communications device 11a-11b may comprise at least one of a portable or personal media player (e.g., music or MP3 players, video players, etc.), a remote control (e.g., television or stereo remotes, etc.), a portable gaming device, a portable or mobile telephone, a smartphone, a tablet computer, etc. Each mobile wireless communications device 11a-11b illustratively includes a first NFC device 13a-13b, which may include NFC transceivers and associated control circuitry, for example.

Additionally, each mobile wireless communications device 11a-11b illustratively includes a second wireless transceiver 12a-12b configured to communicate with the wireless access point 20. For example, the second wireless transceivers 12a-12b may each comprise a wireless local area network (WLAN) or WiFi transceiver, an IEEE 802.16 (WiMAX) transceiver, etc. Other suitable transceivers (e.g., local area network, metropolitan area network transceivers, etc.) may also be used.

Furthermore, the wireless communication system 10 illustratively includes a second NFC device 15 adjacent the entrance 24 of the defined space 14, and a third NFC device 16 within the defined space 14. For example, the second NFC device 15 may be placed at an entrance door so that the second NFC device is swiped as the mobile wireless communications device 11a enters (or exits) the defined space 14 (Block 33). In retail establishment applications, the third NFC device 16 may be placed directly adjacent a point-of-sale terminal, i.e., only allowing authorized customers access to the third NFC device. Nevertheless, the third NFC device 16 may generally be positioned within the defined space 14 so that only authorized devices have access thereto (Block 35). For example, the second and third NFC devices 15-16 may be associated with kiosk devices or control panel devices.

In cooperation with the second and third NFC devices 15-16, the controller 22 is illustratively configured to permit wireless communications of a given mobile wireless communications device (shown as 11a) with the wireless access point 20 based upon communication of the corresponding first NFC device 13a with the second and third NFC devices 15, 16 (Blocks 33, 35). In an example embodiment, the controller 22 permits network access based upon the respective first NFC device 13a of the given mobile wireless communications device 11a being swiped sequentially at the second and third NFC devices 15, 16. In other words, the given mobile wireless communications device 11a is granted network access once it is established that the user is authorized, i.e. physical access to the interior of the defined space 14 is equated to authorized use.

In this illustrated embodiment, each mobile wireless communications device 11a-11b has a unique identification associated therewith. For example, the unique identification may comprise a Media Access Control address (MAC address), a Mobile Equipment Identifier (MEID), an International Mobile Equipment Identity (IMEI), etc. In such embodiments, the second and third NFC devices 15-16 may be configured to receive a respective unique identification from adjacent (swiped) mobile wireless communications devices 11a-11b and to correlate the unique identifiers to determine whether a mobile wireless communications device is authorized. That is, the controller 22 is illustratively configured to permit the given mobile wireless communications device 11a to access wireless communications in the wireless communication system when a same respective unique identification associated therewith is sequentially received at the second and third NFC devices 15-16 (Blocks 37, 39). In some example embodiments, the unique identification may be validated or authenticated from a UID database.

Moreover, the controller 22 is illustratively configured to disable wireless communications of the given mobile wireless communications device 11a with the wireless access point 20 based upon a subsequent communication of the corresponding first NFC device 13a with the second NFC device 15. In particular, when the given mobile wireless communications device 11a is swiped at the second NFC device 15 a second time, thereby indicating the given mobile wireless communications device 11a has left the defined space 14, access to the wireless access point 20 is disabled (Blocks 41, 43, & 45).

The wireless communication system 10 also illustratively includes one or more other companion wireless communications devices 23. For example, the one or more other wireless communications devices 23 may comprise a printer device. As another example, the one or more other wireless communications devices 23 may comprise a photocopying device. As another example, the one or more other wireless communications devices 23 may comprise a scanner device. As another example, the one or more other wireless communications devices 23 may comprise a fax machine. As another example, the one or more other wireless communications devices 23 may comprise a projector device. As another example, the one or more other wireless communications devices 23 may comprise an external display device. As another example, the one or more other wireless communications devices 23 may comprise an external speaker device. The one or more other wireless communications devices 23 may comprise additional types of devices or resources. The one or more other wireless communications devices 23 may comprise a combination of any of the foregoing example devices. In the illustrated embodiment, the controller 22 is configured to permit access to the companion device 23 in the defined space 14 for the given mobile wireless communications device 11a based upon communication of the corresponding first NFC device 13a with the second and third NFC devices 15-16. As will be appreciated, the one or more other wireless communications devices 23 is optional and may be excluded in other embodiments.

Moreover, in certain embodiments, the controller 22 may be configured to permit wireless communications of the given mobile wireless communications device 11a further based upon receipt of an electronic payment associated therewith. Particularly, this feature is advantageous in embodiments where the defined space 14 is related to a retail establishment.

The wireless communication system 10 advantageously permits only authorized mobile wireless communications devices 11a access to network resources, such as access to the wireless access point 20, for example. Access to network resources is selectively allocated based upon physical reach to the defined space 14. Indeed, reaching only the perimeter of the defined space 14 would not provide access since the first mobile wireless communications device 11a needs to be swiped at both the second NFC device 15 (which is located at the entrance 24 to the defined space 14) and the third NFC device 16 (which is located within the defined space), i.e. the authorized mobile wireless communications device has physical access (reaches) to the interior of the defined space.

Example components of a mobile wireless communications device 1000 that may be used in accordance with the above-described embodiments are further described below with reference to FIG. 3. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 3:
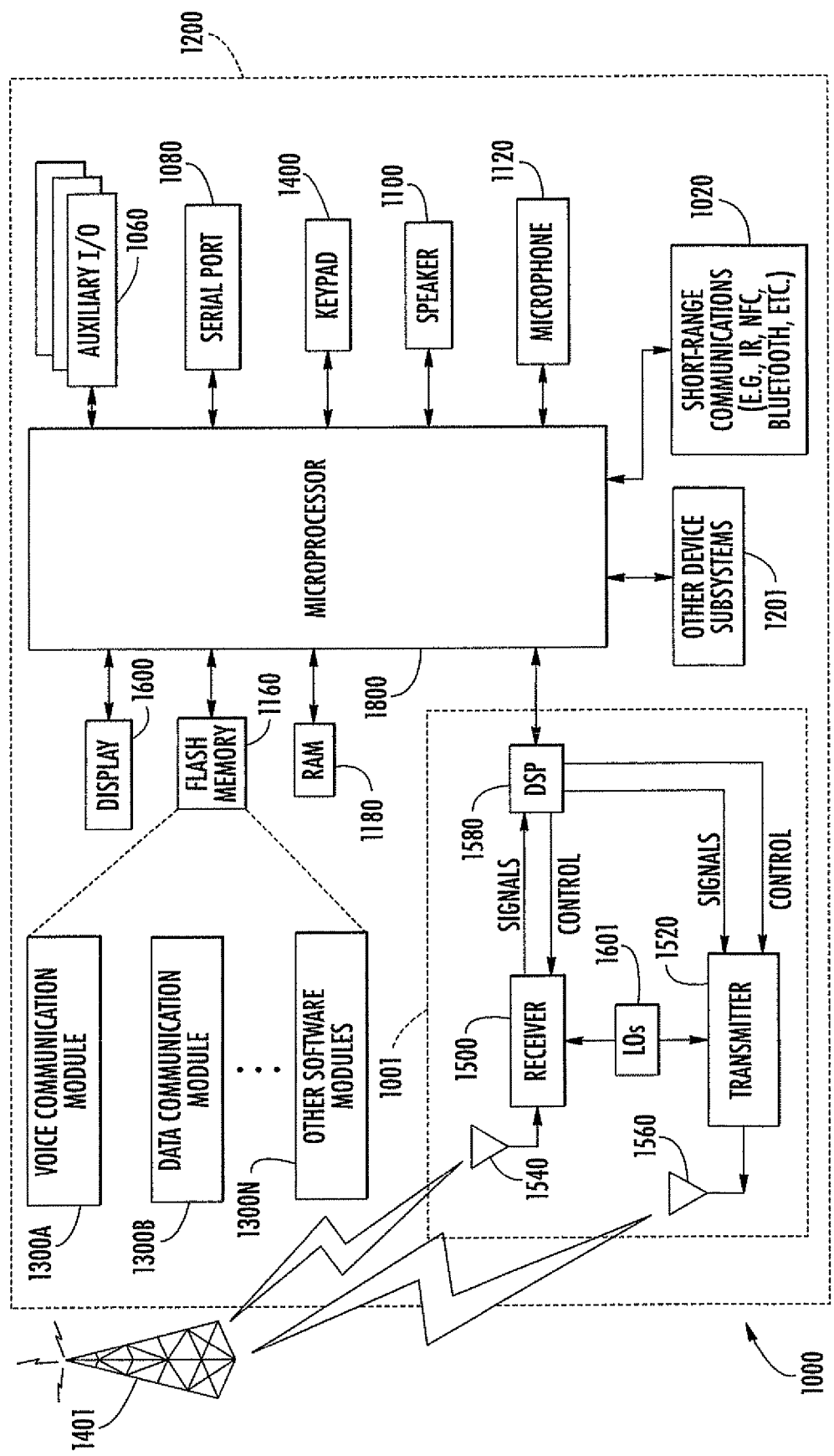
FIG. 3 is a schematic block diagram illustrating example components of a mobile wireless communications device that may be used with the wireless communication system of FIG. 1.

In addition to the processing device 1800, other parts of the mobile device 1000 are shown schematically in FIG. 3. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Additional features and advantages may be found in the co-pending application bearing U.S. Ser. No. 13/036,689, which is also assigned to the present assignee and is hereby incorporated herein in its entirety by reference.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communication system comprising:
a wireless access point comprising a first wireless transceiver and a controller associated therewith and configured to provide wireless communications within a defined space having an entrance;
a plurality of mobile wireless communications devices, each comprising a first near field communications (NFC) device and a second wireless transceiver capable of communicating with said first wireless transceiver;
a second NFC device adjacent the entrance of the defined space; and
a third NFC device within the defined space;
said controller configured to
permit wireless communications of a given mobile wireless communications device from among said plurality of mobile wireless communications devices with said wireless access point based upon sequential communication of the corresponding first NFC device with said second NFC device, indicating that said given mobile wireless communications device has entered the defined space, followed by said third NFC device, and
disable wireless communications of said given mobile wireless communications device with said wireless access point based upon a subsequent communication of the corresponding first NFC device with the second NFC device indicating that said given mobile wireless communications device has left the defined space.

2. The wireless communication system of claim 1 wherein each mobile wireless communications device has a unique identification associated therewith; and wherein said second and third NFC devices are configured to receive a respective unique identification from an adjacent mobile wireless communications device.

3. The wireless communication system of claim 2 wherein said controller is configured to permit wireless communications when a same respective unique identification is sequentially received at said second and third NFC devices.

4. The wireless communication system of claim 1 further comprising at least one other wireless communications device within the defined space; and wherein said controller is configured to permit wireless communication between the given mobile wireless communications device and the at least one other wireless communications device based upon the communication of the corresponding first NFC device with said second and third NFC devices.

5. The wireless communication system of claim 4 wherein said at least one other wireless communications device comprises at least one of a printer device, a projector device, a photocopying device, a scanner device, a fax machine, a display device, or an external speaker device.

6. The wireless communication system of claim 1 wherein said first and second wireless transceivers each comprises a respective wireless local area network transceiver.

7. The wireless communication system of claim 1 wherein said controller is configured to permit wireless communications further based upon receipt of an electronic payment.

8. The wireless communication system of claim 1 wherein said plurality of mobile wireless communications devices comprises at least one of a cellular wireless communications device, a laptop personal computer device, or a tablet computing device.

9. A wireless access point for a wireless communication system comprising a plurality of mobile wireless communications devices, each comprising a first near field communications (NFC) device and a second wireless transceiver, the wireless communications system further including a second NFC device adjacent the entrance of a defined space and a third NFC device within the defined space, the wireless access point comprising:
a first wireless transceiver and a controller associated therewith and configured to provide wireless communications within the defined space;
said controller configured to
permit wireless communications of a corresponding second wireless transceiver of a given mobile wireless communications device from among said plurality of mobile wireless communications devices with said first wireless transceiver based upon sequential communication of the corresponding first NFC device with the second NFC device, indicating that the given mobile wireless communications device has entered the defined space, followed by said third NFC device, and disable wireless communications of the given mobile wireless communications device with the wireless access point based upon a subsequent communication of the corresponding first NFC device with the second NFC device indicating that the given mobile wireless communications device has left the defined space.

10. The wireless access point of claim 9 wherein said controller is configured to permit wireless communication between the respective second wireless transceiver of the given mobile wireless communications device and at least one other wireless communications device also based upon the communication of the corresponding first NFC device with the second and third NFC devices.

11. The wireless access point of claim 10 wherein the at least one other wireless communications device comprises at least one of a printer device, a projector device, a photocopying device, a scanner device, a fax machine, a display device, or an external speaker device.

12. The wireless access point of claim 9 wherein said first wireless transceiver comprises a wireless local area network transceiver.

13. The wireless access point of claim 9 wherein said controller is configured to permit wireless communications further based receipt of an electronic payment.

14. A method of operating a wireless access point in a wireless communication system for providing wireless communications within a defined space having an entrance, the wireless communication system including a plurality of mobile wireless communications devices each comprising a first near field communications (NFC) device, a second NFC device adjacent the entrance of the defined space, and a third NFC device within the defined space, the method comprising:

permitting wireless communications of a given mobile wireless communications device with the wireless access point based upon sequential communication of a corresponding first NFC device with the second NFC device, indicating that the given mobile wireless communications device has entered the defined space, followed by the third NFC device, and disabling wireless communications of the given mobile wireless communications device with the wireless access point based upon a subsequent communication of the corresponding first NFC device with the second NFC device indicating that the given mobile wireless communications device has left the defined space.

15. The method of claim 14 wherein permitting wireless communications further comprises permitting wireless communications of the given wireless communications device when a same respective unique identification associated therewith is sequentially received at the second and third NFC devices.

16. The method of claim 14 further comprising permitting wireless communications between the given mobile wireless communications device with at least one other wireless communications device in the defined space also based upon the communication of the corresponding first NFC device with the second and third NFC devices.

* * * * *